(12) United States Patent
Gu et al.

(10) Patent No.: US 11,853,387 B2
(45) Date of Patent: Dec. 26, 2023

(54) METHOD, ELECTRONIC DEVICE AND STORAGE MEDIUM FOR DATA PROJECTION

(71) Applicant: THE CHINESE UNIVERSITY OF HONG KONG, SHENZHEN, Guangdong (CN)

(72) Inventors: Chonglin Gu, Guangdong (CN); Changyi Ma, Guangdong (CN); Wenye Li, Guangdong (CN); Shuguang Cui, Guangdong (CN)

(73) Assignee: THE CHINESE UNIVERSITY OF HONG KONG, SHENZHEN, Shenzhen (CN)

( * ) Notice: Subject to any disclaimer, the term of this patent is extended or adjusted under 35 U.S.C. 154(b) by 0 days.

(21) Appl. No.: 18/133,523

(22) Filed: Apr. 12, 2023

(65) Prior Publication Data
US 2023/0259582 A1 Aug. 17, 2023

Related U.S. Application Data

(63) Continuation of application No. PCT/CN2020/100618, filed on Jul. 7, 2020.

(51) Int. Cl.
*G06F 17/16* (2006.01)

(52) U.S. Cl.
CPC .................. *G06F 17/16* (2013.01)

(58) Field of Classification Search
CPC ....................................... G06F 17/16
USPC ........................................... 708/520
See application file for complete search history.

(56) References Cited

FOREIGN PATENT DOCUMENTS

| CN | 109687843 A | * | 4/2019 | ........... G06N 3/0445 |
| CN | 110796625 A | * | 2/2020 | ............. G06F 17/16 |

* cited by examiner

*Primary Examiner* — Tan V Mai

(57) ABSTRACT

A data sparse projection method, includes: randomly initializing a high-dimensional sparse two-dimensional matrix (S1); fixing the high-dimensional sparse two-dimensional matrix, and calculating an optimal output variable by using the high-dimensional sparse two-dimensional matrix (S2); fixing the optimal output variable, and calculating an optimal high-dimensional sparse two-dimensional matrix by using the optimal output variable (S3); and cyclically fixing the high-dimensional sparse two-dimensional matrix and the output variable until the optimal output variable is no longer increased when the high-dimensional sparse two-dimensional matrix is fixed (S4). The high-dimensional sparse two-dimensional matrix is optimized continuously in a randomization and iteration manner, so that the high-dimensional sparse two-dimensional matrix is more stable, similarity features of original data are protected better, and the sparsity and binarity of the method allows the method to have a faster calculation speed in practical application.

9 Claims, 3 Drawing Sheets

METHOD, ELECTRONIC DEVICE AND STORAGE MEDIUM FOR DATA PROJECTION

CROSS-REFERENCE TO RELATED APPLICATIONS

The present application is a Continuation Application of PCT Application No. PCT/CN2020/100618, filed on Jul. 7, 2020, the entire contents of which are hereby incorporated by reference.

TECHNICAL FIELD

The present invention relates to the technical field of data processing, and more particularly to a data sparse projection method, system, electronic device, and storage medium.

DESCRIPTION OF THE PRIOR ART

Random projection technology is an important tool for data analysis, it reexpresses the original input sample data (in matrix form) by using a calculation approach of matrix multiplication, thereby resulting in better performance, such as calculation speed, storage space, accuracy, etc., while preserving original data features.

Existing random projection techniques are mainly LSH (locality sensitive hashing) algorithm and FLY (fruit fly algorithm).

However, the construction of the LSH and the FLY is relatively simple, so that the generation of projection matrix is excessively random, leading to the inability of protecting the similarity characteristics between samples before and after projection. Moreover, since the output results are constantly changing each time, it is unstable in practical application.

SUMMARY OF THE DISCLOSURE

The main object of the present invention is to provide a data sparse projection method, a system, an electronic device and a storage medium, it is intended to solve the technical problem that the generation of the projection matrix in the prior art is too random, leading to the inability of protecting the similarity characteristics between samples before and after projection; moreover, since the output results are constantly changing each time, it is unstable in practical application.

In order to achieve the above object, a first aspect of the present invention provides a data sparse projection method including: randomly initializing a high-dimensional sparse two-dimensional matrix; fixing the high-dimensional sparse two-dimensional matrix, and calculating an optimal output variable by using the high-dimensional sparse two-dimensional matrix; fixing the optimal output variable, and calculating an optimal high-dimensional sparse two-dimensional matrix by using the optimal output variable; and cyclically fixing the high-dimensional sparse two-dimensional matrix and the output variable, until the optimal output variable is no longer increased when the high-dimensional sparse two-dimensional matrix is fixed, at which point a final high-dimensional sparse two-dimensional matrix is generated.

Further, fixing the high-dimensional sparse two-dimensional matrix, and calculating an optimal output variable by using the high-dimensional sparse two-dimensional matrix includes: training a set according to existing samples, wherein the samples comprise input vectors, or input vectors and output variables, the input vectors is the high-dimensional sparse two-dimensional matrix; establishing a functional relationship between the input vectors in the set and output vectors by using a winner-take-all (WTA) algorithm; and fixing the high-dimensional sparse two-dimensional matrix, calculating the optimal output variable according to the fixed high-dimensional sparse two-dimensional matrix and the functional relationship.

Further, fixing the high-dimensional sparse two-dimensional matrix, and calculating an optimal output variable by using the high-dimensional sparse two-dimensional matrix further includes: putting a sparsity constraint on the high-dimensional sparse two-dimensional matrix according to a given constraint value; and constraining the output variable according to the winner-take-all algorithm and the constrained high-dimensional sparse two-dimensional matrix.

A second aspect of the present invention provides a data sparse projection system including: an initialization module, configured to randomly initialize a high-dimensional sparse two-dimensional matrix; an optimal output variable calculation module, configured to fix the high-dimensional sparse two-dimensional matrix initialized by the initialization module, and calculate an optimal output variable by using the high-dimensional sparse two-dimensional matrix; an optimal high-dimensional sparse two-dimensional matrix calculation module, configured to fix the optimal output variable calculated by the optimal output variable calculation module and to calculate an optimal high-dimensional sparse two-dimensional matrix by using the optimal output variable; and a cycle module, configured to cyclically fix the high-dimensional sparse two-dimensional matrix and the output variable, until the optimal output variable is no longer increased when the high-dimensional sparse two-dimensional matrix obtained by the optimal high-dimensional sparse two-dimensional matrix calculation module is fixed.

Further, the optimal output variable calculation module includes: a set training unit, configured to train a set according to existing samples, wherein the samples comprise input vectors, or input vectors and output variables, the input vectors is the high-dimensional sparse two-dimensional matrix; a functional relationship establishing unit, configured to establish a functional relationship between the input vectors in the set and output vectors by using a winner-take-all algorithm; and a calculation unit, configured to fix the high-dimensional sparse two-dimensional matrix and to calculate the optimal output variable according to the fixed high-dimensional sparse two-dimensional matrix in the set trained by the set training unit and the functional relationship established by the functional relationship establishing unit.

Further, the optimal output variable calculation module further includes: a high-dimensional sparse two-dimensional matrix constraint unit, configured to put a sparsity constraint on the high-dimensional sparse two-dimensional matrix according to a given constraint value; and an output variable constraint unit, configured to put a constraint on the output variable according to the winner-take-all algorithm and the high-dimensional sparse two-dimensional matrix constrained by the high-dimensional sparse two-dimensional matrix constraint unit.

A third aspect of the present invention provides an electronic device including a memory, a processor, and a computer program stored on the memory and executable on the processor, wherein, when executed by the processor, the computer program implements the method of any one of the above.

A fourth aspect of the present invention provides computer-readable storage medium having stored thereon a computer program which, when executed by a processor, implements the method of any one of the above.

The present invention provides a data sparse projection method with the beneficial effects that: the high-dimensional sparse two-dimensional matrix is constantly optimized in a random and iterative manner, such that the high-dimensional sparse two-dimensional matrix is more stable, protects the similarity features of the original data better, and has faster calculating speed in practical applications due to its sparsity and binarity.

BRIEF DESCRIPTION OF DRAWINGS

In order to illustrate the embodiments of the present invention or the technical solutions in the prior art more clearly, the figures required in the description of the embodiments or of the prior art will be briefly described below, and it will be apparent that the figures in the description below are only some embodiments of the invention, those skilled in the art may obtain further figures without creative effort according to the figures.

DESCRIPTION OF EMBODIMENTS

To make the objects, features and advantages of the present invention more apparent and understandable, the technical solutions in embodiments of the present invention will now be clearly and completely described, taken in conjunction with the accompanying drawings in embodiments of the present invention, and it will be apparent that the embodiments described are only some, but not all, embodiments of the present invention. Based on the embodiments in the present invention, all other embodiments obtained by those skilled in the art without creative effort fall within the protection scope of the present invention.

Figure 1:
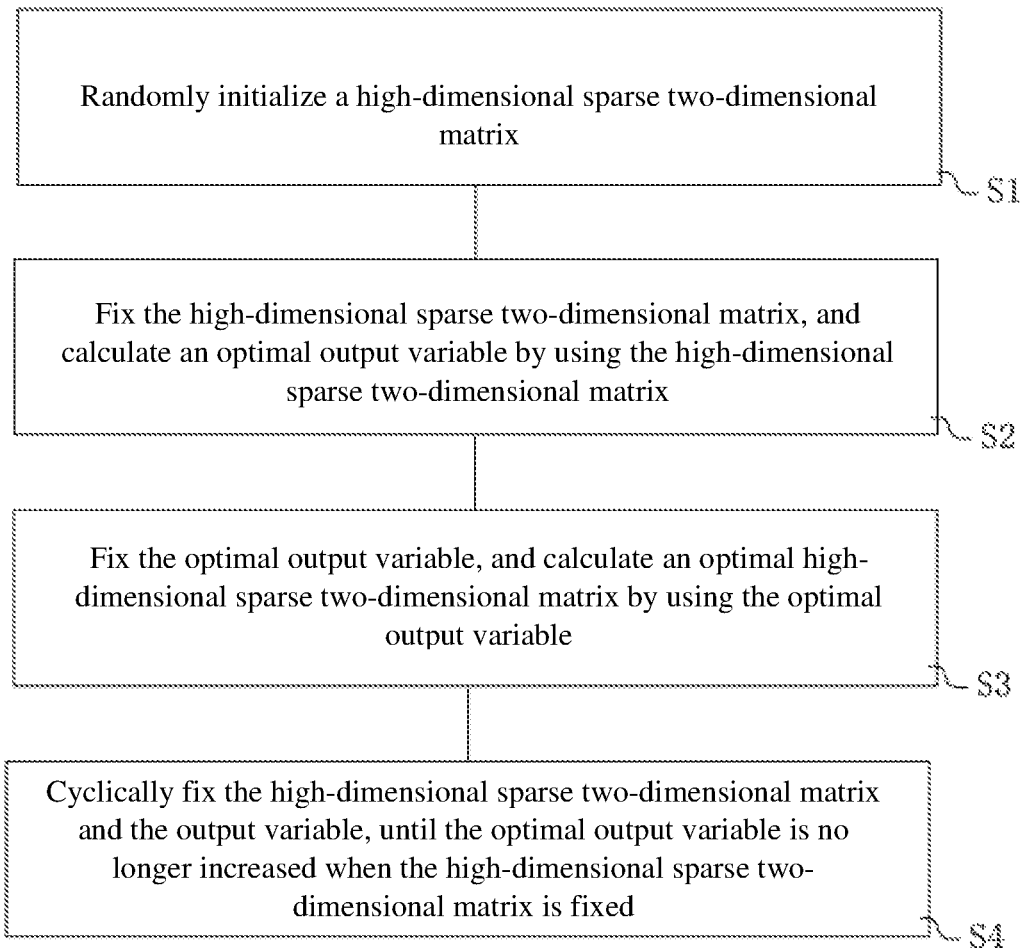
FIG. 1 is a schematic flow chart illustrating a data sparse projection method in accordance with an embodiment of the present invention.

FIG. 1 shows a data sparse projection method including: S1, randomly initializing a high-dimensional sparse two-dimensional matrix; S2, fixing the high-dimensional sparse two-dimensional matrix, and calculating an optimal output variable by using the high-dimensional sparse two-dimensional matrix; S3, fixing the optimal output variable, and calculating an optimal high-dimensional sparse two-dimensional matrix by using the optimal output variable; and S4, cyclically fixing the high-dimensional sparse two-dimensional matrix and the output variable, until the optimal output variable is no longer increased when the high-dimensional sparse two-dimensional matrix is fixed.

Specifically, at the beginning of the method, a W is randomly initialized and noted as $W^1$, and the W and a Y are constantly optimized by interactive iteration, wherein the Y is the output variable, and an iterative optimization process is that:

For the t-th iteration, the W is fixed and noted as $W^t$, while a function $L(W, Y)$ of variable Y is maximized, at which point the optimal $Y^t$ is obtained; then the Y is fixed noted as $Y^t$, while the function $L(W, Y)$ of the variable W is maximized, to obtain $W^{t+1}$, the above steps are repeated until $L(W,Y)$ is no longer increased, i.e., the value of the function converges.

Fixing the high-dimensional sparse two-dimensional matrix, and calculating an optimal output variable by using the high-dimensional sparse two-dimensional matrix includes: training a set according to existing samples, wherein the samples comprise input vectors, or input vectors and output variables, the input vectors is the high-dimensional sparse two-dimensional matrix; establishing a functional relationship between the input vectors in the set and output vectors by using a winner-take-all (WTA) algorithm; and fixing the high-dimensional sparse two-dimensional matrix, calculating the optimal output variable according to the fixed high-dimensional sparse two-dimensional matrix and the functional relationship.

Fixing the high-dimensional sparse two-dimensional matrix, and calculating an optimal output variable by using the high-dimensional sparse two-dimensional matrix further includes: putting a sparsity constraint on the high-dimensional sparse two-dimensional matrix according to a given constraint value; and putting a binarize constraint on the output variable according to the winner-take-all algorithm and the constrained high-dimensional sparse two-dimensional matrix.

In the above, the optimal $Y^t$ can be easily obtained by $y_{\cdot m} = WTA_k^{d'}(Wx_{\cdot m})$, wherein ($1 \le m \le n$).

First, a sample set $X = \{x_1, \ldots, x_n\}$ is given, wherein each sample $x_{\cdot m} \in R^d (1 \le m \le n)$. Based on the training set X, we hope to obtain a high-dimensional sparse two-dimensional matrix W projecting a d-dimensional input vectors $\{x_{\cdot 1}, \ldots, x_{\cdot n}\}$ to a d'-dimensional (d' is much larger than d) sparse binary vectors $\{y_{\cdot 1}, \ldots, y_{\cdot n}\}$, and each pair of the input vector and the output vector satisfies $y_m = WTA_k^{d'}(Wx_{\cdot m})$.

$WTA_k^{d'}: R^{d'} \{0,1\}^{d'}$ is expected to represent a WTA calculation method. That is: for $1 \le i \le d'$, $$y_i = \begin{cases} 1, & \text{When } (Wx)_i \text{ is one of the largest } k \text{ elements in } Wx \\ & (k \text{ is far less than } d) \\ 0, & \text{other situations} \end{cases}$$

Here k denotes a projected hash length. Since there is noise in the actual training data, to find a projection matrix W, the problem translates into a maximization problem with respect to the variable W and the variable Y, namely:

$$\text{Maximize: } L(W, Y) = \sum_{m=1}^{n} \sum_{i=1}^{d'} \sum_{j=1}^{d'} y_{im}(1 - y_{jm})(w_i x_{\cdot m} - w_j x_{\cdot m})$$

Let $l_{mij} = y_{im}(1-y_{jm})(w_i x_{\cdot m} - w_j x_{\cdot m})$, when $y_{im}=1$ and $y_{jm}=0$, $w_i x_{\cdot m} \ge w_j x_{\cdot m}$, such that $l_{mij}$ increases, the overall $L(W, Y)$ increases in the positive direction; otherwise, $l_{mij}=0$, has no effect on $L(W, Y)$, so the problem is eventually to find ideal W and Y. For the sparse binary projection, we put a sparsity constraint on W, for a given c, we have:

$$w_{i\cdot} \in \{0,1\}^d \text{ and } \sum_{j=1}^{d} w_{ij} = c (1 \le i \le d))$$

From the WTA function we have the constraint on Y as follows:

$$y_{.m} \in \{0,1\}^{d'} \text{ and } \sum_{i=1}^{d'} y_{im} = k (1 \le m \le n)$$

For the optimal $W^{t-1}$, we have the following derivation:

$$\max L(W, Y^t) \Leftrightarrow \max \sum_{m=1}^{n} \left\{ d' \sum_{i=1}^{d'} y_{im}^t w_{i.} x_{.m} - k \sum_{j=1}^{d'} w_{j.} x_{.m} \right\}$$

$$\Leftrightarrow \max \sum_{m=1}^{n} \left\{ \sum_{i=1}^{d'} y_{im}^t w_{i.} x_{.m} - \frac{k}{d'} \sum_{i=1}^{d'} w_{i.} x_{.m} \right\}$$

$$\Leftrightarrow \sum_{i=1}^{d'} \max \left\{ w_{i.} \left[ \sum_{m=1}^{n} x_{.m} \left( y_{im}^t - \frac{k}{d'} \right) \right] \right\}$$

Thus the optimal $W^{t+1}$ is $w_i^{t-1} = WTA_c^d(s_{.i}^t)$, for all $1 \le i \le d$, and $$s_{.i}^t = \sum_{m=1}^{n} x_{.m} \left( y_{im}^t - \frac{k}{d'} \right)$$

Through the interactive iterative optimization process, our function value may obtain a locally optimal solution, and converge when the function value L(W, Y) is no longer increasing.

In summary, this embodiment of the present invention provides a data sparse projection method that generates a high quality projection matrix that, for the samples that both input and output are given, can directly generate the optimal high-dimensional sparse two-dimensional matrix according to the methods described above, and is suitable for supervised learning.

In the situation that only the input samples are given and the output samples isn't given, the high-dimensional sparse two-dimensional matrix is constantly optimized through random high-dimensional sparse two-dimensional matrix and iterative approach, such that the generated projection matrix is more stable and protects the similarity features of the original data better, has faster calculating speed in practical applications due to its sparsity and binarity, and is suitable for unsupervised learning. The projection matrix in the present invention is learned from the input data and have the beneficial efforts of being more stable, better feature protection, and faster calculation than existing methods.

Figure 2:
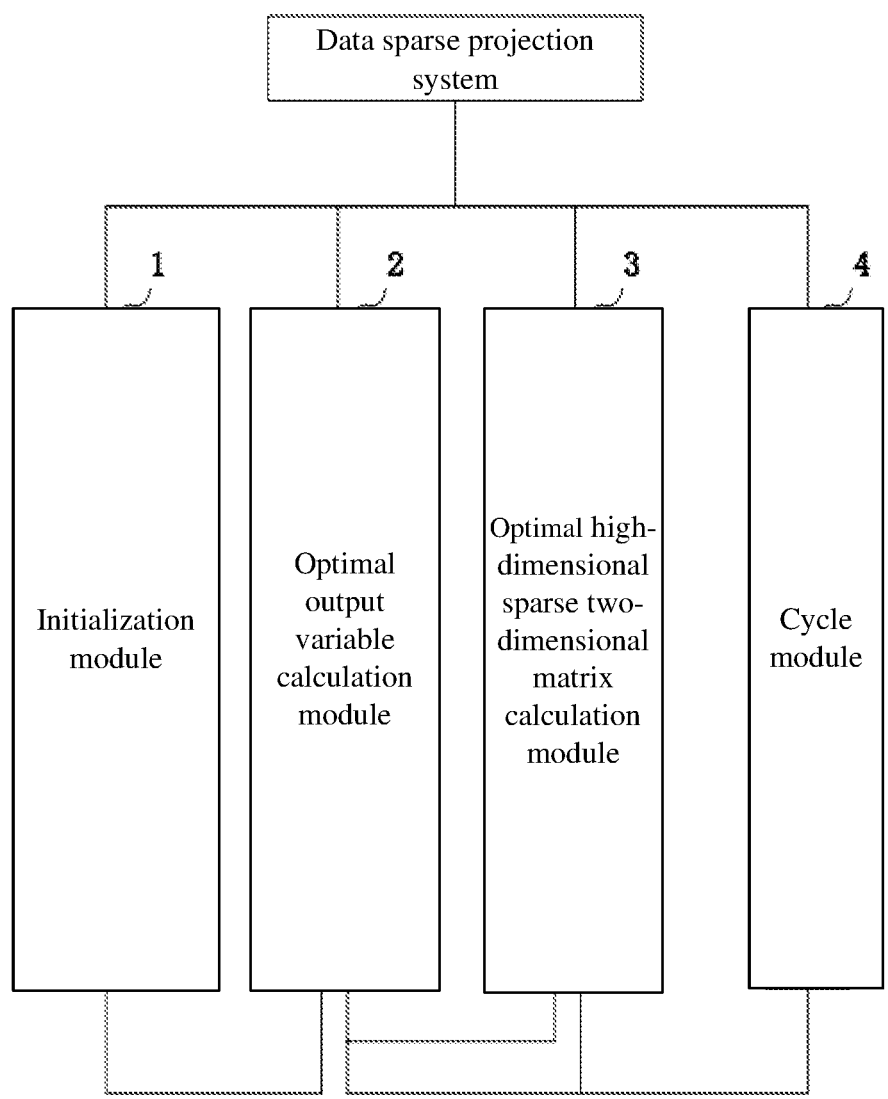
FIG. 2 is a schematic block diagram illustrating a sparse data projection system in accordance with an embodiment of the invention.

Referring now to FIG. 2, an embodiment of the present disclosure also provides a data sparse projection system, including: an initialization module 1, an optimal output variable calculation module 2, an optimal high-dimensional sparse two-dimensional matrix calculation module 3, and a cycle module 4. The initialization module 1 is configured to randomly initialize a high-dimensional sparse two-dimensional matrix. The optimal output variable calculation module 2 is configured to fix the high-dimensional sparse two-dimensional matrix initialized by the initialization module 1, and calculate an optimal output variable by using the high-dimensional sparse two-dimensional matrix. The optimal high-dimensional sparse two-dimensional matrix calculation module 3 is configured to fix the optimal output variable calculated by the optimal output variable calculation module 2 and to calculate an optimal high-dimensional sparse two-dimensional matrix by using the optimal output variable. The cycle module 4 is configured to cyclically fix the high-dimensional sparse two-dimensional matrix and the output variable, until the optimal output variable is no longer increased when the high-dimensional sparse two-dimensional matrix obtained by the optimal high-dimensional sparse two-dimensional matrix calculation module 2 is fixed.

The optimal output variable calculation module 2 includes a set training unit, a functional relationship establishing unit and a calculation unit. The set training unit is configured to train a set according to existing samples, wherein the samples comprise input vectors, or input vectors and output variables, the input vectors is the high-dimensional sparse two-dimensional matrix. The functional relationship establishing unit is configured to establish a functional relationship between the input vectors in the set and output vectors by using a winner-take-all (WTA) algorithm. The calculation unit is configured to fix the high-dimensional sparse two-dimensional matrix and to calculate the optimal output variable according to the fixed high-dimensional sparse two-dimensional matrix in the set trained by the set training unit and the functional relationship established by the functional relationship establishing unit.

The optimal output variable calculation module 2 further comprises: a high-dimensional sparse two-dimensional matrix constraint unit and an output variable constraint unit. The high-dimensional sparse two-dimensional matrix constraint unit is configured to put a sparsity constraint on the high-dimensional sparse two-dimensional matrix according to a given constraint value. The output variable constraint unit is configured to put a constraint on the output variable according to the winner-take-all algorithm and the high-dimensional sparse two-dimensional matrix constrained by the high-dimensional sparse two-dimensional matrix constraint unit.

Figure 3:
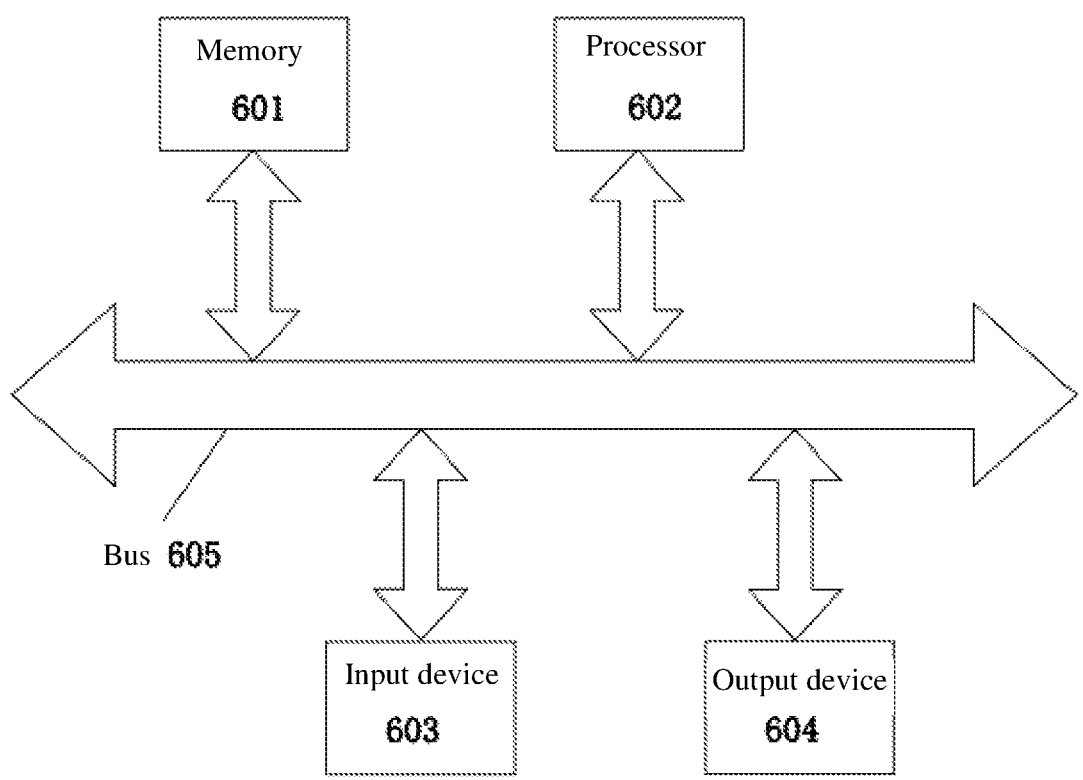
FIG. 3 is a schematic block diagram illustrating an electronic device in accordance with an embodiment of the present invention.

An embodiment of the present disclosure provides an electronic device, shown in FIG. 3, including: a memory 601, a processor 602, and a computer program stored on the memory 601 and executable on the processor 602 which, when executed by the processor 602, implements the data sparse projection method described in the foregoing.

Further, the electronic apparatus includes at least one input device 603 and at least one output device 604.

The above-mentioned memory 601, processor 602, input device 603, and output device 604 are connected by a bus 605.

Wherein, the input device 603 specifically may be a camera, a touch panel, a physical button, a mouse, or the like. The output device 604 may in particular be a display screen.

The memory 601 may be a high speed Random Access Memory (RAM) or non-volatile memory such as disk memory. The memory 601 is used to store a set of executable program codes, and the processor 602 is coupled to the memory 601.

Further, an embodiment of the present application also provides a computer-readable storage medium that may be arranged in the electronic device of the above-described embodiments, and the computer-readable storage medium may be the memory 601 of the previously described embodiments. The computer-readable storage medium has stored thereon a computer program which, when executed by the processor 602, implements the data sparse projection method described in the aforementioned method embodiments.

Further, the computer-readable storage medium may also be a variety of media which can store the program code, such as a USB disk, a removable hard disk, a Read-Only Memory 601 (ROM), a RAM, a magnetic disk, or an optical disk and so on.

In some embodiments provided herein, it should be understood that the disclosed apparatus and methods may be implemented in other ways. For example, the apparatus embodiments described above are merely illustrative, e.g., the division of the modules, just a sort of logical functional division, and additional divisions are possible in actually implementation, e.g., multiple modules or components may be combined or integrated into another system, or some features may be ignored or not performed. At another point, the coupling or direct coupling or communicative connection shown or discussed to each other may be an indirect coupling or communicative connection through some interface, device, or module, and may be electrical, mechanical, or otherwise.

Modules described as separate components may or may not be physically separated, and components shown as modules may or may not be physical modules, i.e., may be located in one place, or may be distributed over a plurality of network modules. Some or all of the modules may be selected as desired to achieve the objectives of the embodiments.

Furthermore, the functional modules in each embodiment of the invention may be integrated into one processing module, may also physically exist separately, or two or more modules may be integrated into in one module. The above-described integrated modules may be implemented in the form of hardware or software functional modules.

The integrated modules, if implemented in the form of software function modules and sold or used as stand-alone products, may be stored in a computer readable storage medium. Based on such understanding, a part of the technical solution of the present invention, essentially or contributing to the prior art, or all or a part of the technical solution, may be embodied in the form of a software product, the computer software product is stored on a storage medium and includes instructions for causing a computer device, which could be a personal computer, a server, a network device, or the like, to perform all or part of the steps of the methods of the various embodiments of the present invention.

It is to be understood that the foregoing method embodiments are presented as a series of combinations of acts for ease of description, but those skilled in the art will appreciate that the present invention is not limited by the order of acts described, as certain steps may be performed in other orders or simultaneously, in accordance with the present invention. Second, those skilled in the art will also appreciate that the embodiments described in the specification all pertain to preferred embodiments and the acts and modules involved are not necessarily required to the invention.

In the above embodiments, the description of each embodiment has its own emphasis. For the part not detailed in one embodiment, please refer to the related description of other embodiments.

The foregoing is descriptions of a data sparse projection method, a system, an electronic device and a storage medium provided by the present invention. To those skilled in the art, according to the idea of embodiments of the invention, there will be changes in the specific embodiments and application scope. In summary, the contents of this specification shall not be construed as limitations of the invention.

The invention claimed is:

1. A computer-implemented method for data projection comprising:
    providing an electronic device comprising a processor, an input device and an output device, wherein the input device and the output device are electrically coupled to the processor;
    randomly initializing, by the processor, a high-dimensional sparse two-dimensional matrix;
    fixing, by the processor, the high-dimensional sparse two-dimensional matrix, and calculating an optimal output variable by using the high-dimensional sparse two-dimensional matrix through supervised learning or unsupervised learning;
    fixing, by the processor, the optimal output variable, and calculating an optimal high-dimensional sparse two-dimensional matrix by using the optimal output variable;
    cyclically fixing, by the processor, the high-dimensional sparse two-dimensional matrix and the output variable, until the optimal output variable is no longer increased when the high-dimensional sparse two-dimensional matrix is fixed, at which point a final high-dimensional sparse two-dimensional matrix is generated;
    re-expressing, by the processor, sample data using the final high-dimensional sparse two-dimensional matrix to obtain a projected sample data, wherein the sample data is in a matrix form and is inputted by the input device; and
    outputting, by the output device, the projected sample data.

2. The method of claim 1, wherein fixing, by the processor, the high-dimensional sparse two-dimensional matrix, and calculating an optimal output variable by using the high-dimensional sparse two-dimensional matrix through the supervised learning or the unsupervised learning comprises:
    training, by the processor, a set according to existing samples, wherein the samples comprise input vectors, or input vectors and output variables, the input vectors is the high-dimensional sparse two-dimensional matrix;
    establishing, by the processor, a functional relationship between the input vectors in the set and output vectors by using a winner-take-all (WTA) algorithm; and
    fixing, by the processor, the high-dimensional sparse two-dimensional matrix, calculating the optimal output variable according to the fixed high-dimensional sparse two-dimensional matrix and the functional relationship.

3. The method of claim 2, wherein fixing, by the processor, the high-dimensional sparse two-dimensional matrix, and calculating an optimal output variable by using the high-dimensional sparse two-dimensional matrix through the supervised learning or the unsupervised learning further comprises:
    putting, by the processor, a sparsity constraint on the high-dimensional sparse two-dimensional matrix according to a given constraint value; and
    constraining, by the processor, the output variable according to the winner-take-all algorithm and the constrained high-dimensional sparse two-dimensional matrix.

4. An electronic device comprising a non-transitory memory, a processor, an input device, an output device, and a computer program stored on the non-transitory memory and executable on the processor, wherein, when executed by the processor, the computer program implements a method for data projection, and the method comprises:

randomly initializing a high-dimensional sparse two-dimensional matrix;

fixing the high-dimensional sparse two-dimensional matrix, and calculating an optimal output variable by using the high-dimensional sparse two-dimensional matrix through supervised learning or unsupervised learning;

fixing the optimal output variable, and calculating an optimal high-dimensional sparse two-dimensional matrix by using the optimal output variable;

cyclically fixing the high-dimensional sparse two-dimensional matrix and the output variable, until the optimal output variable is no longer increased when the high-dimensional sparse two-dimensional matrix is fixed, at which point a final high-dimensional sparse two-dimensional matrix is generated;

re-expressing sample data using the final high-dimensional sparse two-dimensional matrix to obtain a projected sample data, wherein the sample data is in a matrix form and is inputted by the input device; and outputting, by the output device, the projected sample data.

5. The electronic device of claim 4, wherein fixing the high-dimensional sparse two-dimensional matrix, and calculating an optimal output variable by using the high-dimensional sparse two-dimensional matrix through the supervised learning or the unsupervised learning comprises:

training a set according to existing samples, wherein the samples comprise input vectors, or input vectors and output variables, the input vectors is the high-dimensional sparse two-dimensional matrix;

establishing a functional relationship between the input vectors in the set and output vectors by using a winner-take-all (WTA) algorithm; and fixing the high-dimensional sparse two-dimensional matrix, calculating the optimal output variable according to the fixed high-dimensional sparse two-dimensional matrix and the functional relationship.

6. The electronic device of claim 5, wherein fixing the high-dimensional sparse two-dimensional matrix, and calculating an optimal output variable by using the high-dimensional sparse two-dimensional matrix through the supervised learning or the unsupervised learning further comprises:

putting a sparsity constraint on the high-dimensional sparse two-dimensional matrix according to a given constraint value; and constraining the output variable according to the winner-take-all algorithm and the constrained high-dimensional sparse two-dimensional matrix.

7. A non-transitory computer-readable storage medium having stored thereon a computer program which, when executed by a processor, implements a method for data projection, and the method comprises:

randomly initializing a high-dimensional sparse two-dimensional matrix;

fixing the high-dimensional sparse two-dimensional matrix, and calculating an optimal output variable by using the high-dimensional sparse two-dimensional matrix through supervised learning or unsupervised learning;

fixing the optimal output variable, and calculating an optimal high-dimensional sparse two-dimensional matrix by using the optimal output variable;

cyclically fixing the high-dimensional sparse two-dimensional matrix and the output variable, until the optimal output variable is no longer increased when the high-dimensional sparse two-dimensional matrix is fixed, at which point a final high-dimensional sparse two-dimensional matrix is generated;

re-expressing sample data using the final high-dimensional sparse two-dimensional matrix to obtain a projected sample data, wherein the sample data is in a matrix form and is inputted by an input device; and outputting, by an output device, the projected sample data.

8. The non-transitory computer-readable storage medium of claim 7, wherein fixing the high-dimensional sparse two-dimensional matrix, and calculating an optimal output variable by using the high-dimensional sparse two-dimensional matrix through the supervised learning or the unsupervised learning comprises:

training a set according to existing samples, wherein the samples comprise input vectors, or input vectors and output variables, the input vectors is the high-dimensional sparse two-dimensional matrix;

establishing a functional relationship between the input vectors in the set and output vectors by using a winner-take-all (WTA) algorithm; and fixing the high-dimensional sparse two-dimensional matrix, calculating the optimal output variable according to the fixed high-dimensional sparse two-dimensional matrix and the functional relationship.

9. The non-transitory computer-readable storage medium of claim 8, wherein fixing the high-dimensional sparse two-dimensional matrix, and calculating an optimal output variable by using the high-dimensional sparse two-dimensional matrix through the supervised learning or the unsupervised learning further comprises:

putting a sparsity constraint on the high-dimensional sparse two-dimensional matrix according to a given constraint value; and constraining the output variable according to the winner-take-all algorithm and the constrained high-dimensional sparse two-dimensional matrix.

* * * * *